US012170719B2

United States Patent
Jung et al.

(10) Patent No.: US 12,170,719 B2
(45) Date of Patent: *Dec. 17, 2024

(54) ELECTRONIC DEVICE USING HOMOMORPHIC ENCRYPTION AND ENCRYPTED DATA PROCESSING METHOD THEREOF

(71) Applicant: Samsung Electronics Co., Ltd., Suwon-si (KR)

(72) Inventors: Ju-Young Jung, Cheonan-si (KR); Jiyoup Kim, Suwon-si (KR); Changkyu Seol, Osan-si (KR); Pilsang Yoon, Hwaseong-si (KR); Jinsoo Lim, Seoul (KR); Myunghoon Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,384

(22) Filed: Oct. 12, 2023

(65) Prior Publication Data

US 2024/0048354 A1 Feb. 8, 2024

Related U.S. Application Data

(63) Continuation of application No. 17/347,055, filed on Jun. 14, 2021, now Pat. No. 11,824,967.

(30) Foreign Application Priority Data

Jul. 7, 2020 (KR) .................. 10-2020-0083213

(51) Int. Cl.
*H04L 9/00* (2022.01)
*G06F 21/32* (2013.01)
(Continued)

(52) U.S. Cl.
CPC .............. *H04L 9/008* (2013.01); *G06F 21/32* (2013.01); *H04L 9/0819* (2013.01);
(Continued)

(58) Field of Classification Search
CPC ......... H04L 9/008; H04L 9/08; H04L 9/0894; H04L 9/0861; H04L 9/0869; H04L 9/06;
(Continued)

(56) References Cited

U.S. PATENT DOCUMENTS 9,760,737 B2  9/2017 Cammarota et al.
10,095,880 B2  10/2018 Bent et al.
(Continued)

FOREIGN PATENT DOCUMENTS

CA  2935130 A1  1/2018
KR  1020160124598 A  10/2016

OTHER PUBLICATIONS

Revolution of Encryption Technology—Homomorphic Encryption, http://imdarc.math.snu.ac.kr/board_apmJ27/3058, Oct. 26, 2018.
(Continued)

*Primary Examiner* — Shaqueal D Wade-Wright
(74) *Attorney, Agent, or Firm* — Muir Patent Law, PLLC

(57) ABSTRACT

An electronic device includes a memory storing data from an external source, an application processing unit (APU) transmitting a secret key and public key generation command, an isolated execution environment (IEE) generating a secret key in response to the secret key generation command, generating a public key based on the secret key in response to the public key generation command, and storing the secret key, and a non-volatile memory performing write and read operations depending on a request of the APU. When the data are stored in the memory, the APU transmits a public key request to the IEE and in response the IEE transfers the public key to the APU through a mailbox
(Continued)

protocol. The APU generates a ciphertext by performing homomorphic encryption on the data based on an encryption key in the public key, and classifies and stores the public key and the ciphertext in the non-volatile memory.

20 Claims, 11 Drawing Sheets

(51) Int. Cl.
*H04L 9/08* (2006.01)
*G06F 21/60* (2013.01)

(52) U.S. Cl.
CPC .......... *H04L 9/0869* (2013.01); *H04L 9/0894* (2013.01); *G06F 21/602* (2013.01)

(58) Field of Classification Search
CPC ......... H04L 9/0662; H04L 9/30; H04L 63/04; H04L 63/0428; H04L 63/0442; G06F 21/60; G06F 21/602
See application file for complete search history.

(56) References Cited

U.S. PATENT DOCUMENTS

| | | | |
|---|---|---|---|
| 10,439,799 | B2 | 10/2019 | Diallo et al. |
| 11,706,022 | B1* | 7/2023 | Zhang ................... H04L 9/0838 713/171 |
| 2016/0204936 | A1 | 7/2016 | Sakemi et al. |
| 2017/0104752 | A1* | 4/2017 | Sakemi ................. H04L 9/0618 |
| 2018/0137284 | A1 | 5/2018 | Oh et al. |
| 2019/0327077 | A1 | 10/2019 | Mandal et al. |
| 2019/0363871 | A1* | 11/2019 | Cheon ..................... H04L 9/304 |
| 2020/0028693 | A1 | 1/2020 | Wu et al. |
| 2020/0036512 | A1 | 1/2020 | Vaikuntanathan et al. |
| 2020/0320206 | A1 | 10/2020 | Cammarota et al. |
| 2021/0211290 | A1 | 7/2021 | Jindal et al. |
| 2021/0266170 | A1 | 8/2021 | Rossi |
| 2022/0094519 | A1 | 3/2022 | JelJeli et al. |

OTHER PUBLICATIONS

About Homomorphic Encryption, The Most Secure Encryption Technology in Existence, https://post.naver.com/viewer/postView.nhn?volumeNo=15914201&memberNo=10728965, Jun. 4, 2018.

Data Centric Security in Cloud Era 2, https://www.samsungsds.com/global/ko/support/insights/Data-Centric-Security-In-Cloud-Era-2.html, Oct. 5, 2018.

Jung Hee Cheon et al., A Full RNS Variant of Approximate Homomorphic Encryption, https://eprint.iacr.org/2018/931.pdf, 21 pages.

Jung Hee Cheon et al., Bootstrapping for approximate homomorphic encryption, https://eprint.iacr.org/2018/153.pdf, 21 pages.

Jung Hee Cheon et al., Homomorphic Encryption for Arithmetic of Approximate Nos., https://eprint.iacr.org/2016/421.pdf, 23 pages.

R. Agrawal et al., "Fast Arithmetic Hardware Library For RLWE-Based Homomorphic Encryption," Jul. 3, 2020.

* cited by examiner

ELECTRONIC DEVICE USING HOMOMORPHIC ENCRYPTION AND ENCRYPTED DATA PROCESSING METHOD THEREOF

CROSS-REFERENCE TO RELATED APPLICATIONS

This application is a continuation of and claims priority to U.S. patent application Ser. No. 17/347,055 filed Jun. 14, 2021, which claims priority under 35 U.S.C. § 119 to Korean Patent Application No. 10-2020-0083213 filed on Jul. 7, 2020, in the Korean Intellectual Property Office, the disclosures of which are incorporated herein by reference in their entirety.

BACKGROUND

Embodiments of the inventive concept described herein relate to an encryption system, and more particularly, relate to an electronic device processing data by using homomorphic encryption and an encrypted data processing method thereof.

As information communication technologies develop, the era of hyper-connectivity in which a lot of data are constantly collected and all devices are connected by the activation of the Internet of Things has arrived. As the traffic of data is increased by the development of communication technologies, there is the increasing need for the development of security technologies. An encryption system is used to exchange communication information as secret information and is directed to provide a user with a network or storage safe in security. To this end, the development of an encryption system is being actively made, and nowadays, there is the increasing concern about a homomorphic encryption technology being a fourth-generation encryption system.

The first-generation encryption system uses a password-based authentication technology. The first-generation encryption system generates a cryptogram by simply changing characters to different characters or changing the order of characters. A second-generation encryption system uses symmetric key encryption. A symmetric key encryption system in which an encryption key and a decryption key are identical performs encryption and decryption by using one encryption key. The symmetric key encryption scheme is advantageous in that a computing speed is relatively fast. However, because a key itself is not encrypted, the symmetric key encryption scheme has the following issues: difficulty in key management and considerable weakness in security. A third-generation encryption system uses asymmetric key encryption. An asymmetric key encryption system in which an encryption key and a decryption key are two different keys. The asymmetric key encryption scheme in which a private key is not opened is advantageous in that a security level is high. However, the asymmetric key encryption scheme is disadvantageous in that a high capacity is required and a processing speed is relatively slow. Also, even in the case of the third-generation encryption system providing a high security level, decryption is performed at least once for the purpose of interpreting data. For this reason, it is impossible to essentially prevent data from being leaked out.

SUMMARY

Embodiments of the inventive concept provide an electronic device processing data internally by using homomorphic encryption and an encrypted data processing method thereof.

According to an exemplary embodiment, an electronic device includes a memory that stores data received from an external source, an application processing unit (APU) that transmits a secret key generation command and a public key generation command, an isolated execution environment (IEE) that generates a secret key in response to the secret key generation command, generates a public key based on the secret key in response to the public key generation command, and stores the secret key, and a non-volatile memory that performs a write operation and a read operation depending on a request of the APU. When the data are stored in the memory, the APU transmits a public key request to the IEE. The IEE transfers the public key to the APU through a mailbox protocol in response to the public key request. The APU generates a ciphertext by performing homomorphic encryption on the data based on an encryption key included in the public key, and the APU classifies and stores the public key and the ciphertext in the non-volatile memory.

According to an exemplary embodiment, an encrypted data processing method includes receiving first data from an external source, loading a public key generated at an isolated execution environment (IEE) through a mailbox protocol, homomorphic encrypting the first data based on an encryption key included in the public key to generate first encrypted data, storing the public key and the first encrypted data in a non-volatile memory, receiving second data from the external source, loading the public key stored in the non-volatile memory, homomorphic encrypting the second data based on the encryption key included in the public key to generate second encrypted data, and performing computation on the first encrypted data and the second encrypted data based on a multiplication key included in the public key.

According to an exemplary embodiment, an electronic device with a malicious code determination function includes a modem that receives information of a malicious code from an external source, an application processing unit (APU) that extracts feature information of the malicious code from the information of the malicious code and transmits a secret key generation command and a public key generation command, an isolated execution environment (IEE) that generates a secret key in response to the secret key generation command, generates a public key based on the secret key in response to the public key generation command, and stores the secret key, and a non-volatile memory that performs a write operation and a read operation depending on a request of the APU. When the feature information of the malicious code is extracted, the APU transmits a public key request to the IEE. The IEE transfers the public key to the APU through a mailbox protocol in response to the public key request. The APU generates first encrypted data by performing homomorphic encryption on the feature information of the malicious code based on an encryption key included in the public key, and the APU stores the first encrypted data in the non-volatile memory.

BRIEF DESCRIPTION OF THE FIGURES

The above and other objects and features of the inventive concept will become apparent by describing in detail exemplary embodiments thereof with reference to the accompanying drawings.

DETAILED DESCRIPTION

Figure 1:
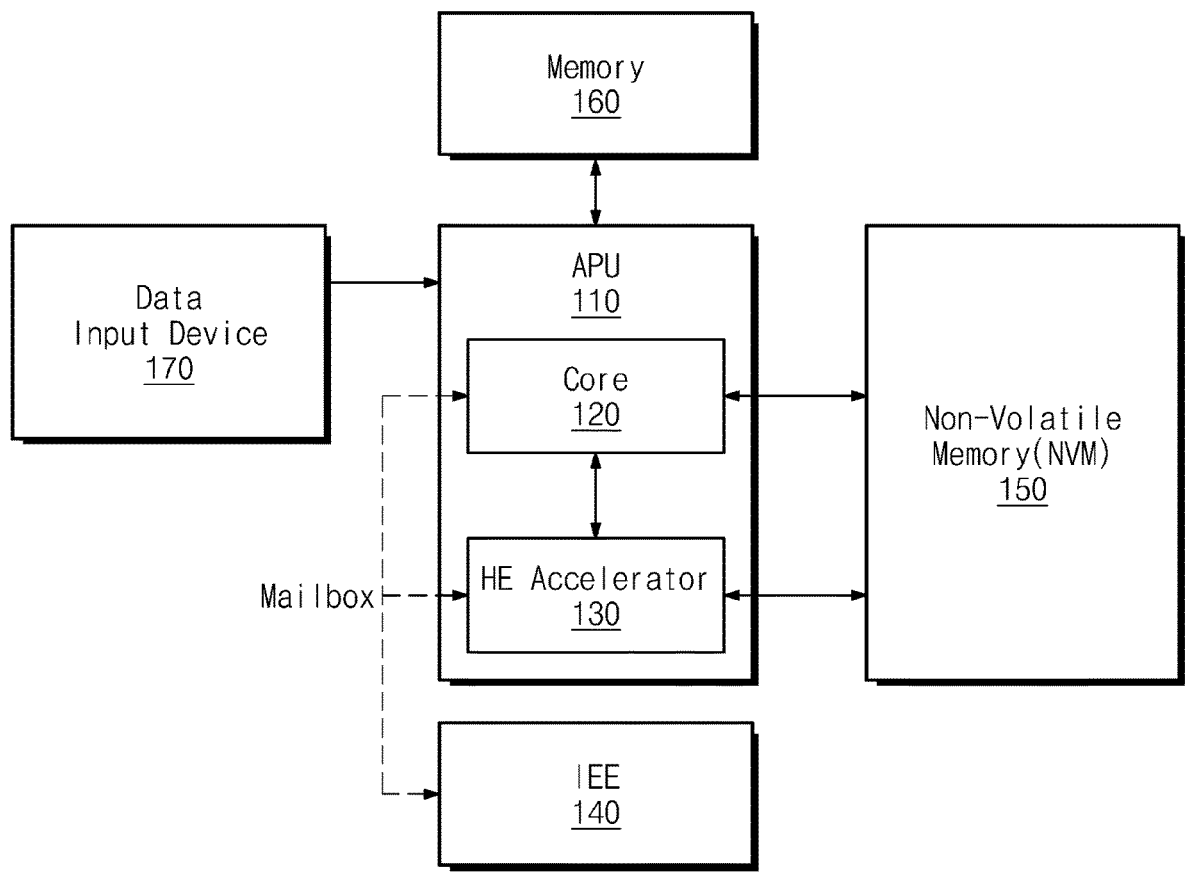
FIG. 1 is a block diagram illustrating an electronic device using homomorphic encryption according to an embodiment of the inventive concept.

Below, embodiments of the inventive concept may be described in detail and clearly to such an extent that an ordinary one in the art easily implements the inventive concept.

The terms used in the specification are provided to describe the embodiments, not to limit the inventive concept. As used in the specification, the singular terms "a," "an" and "the" are intended to include the plural forms as well, unless the context clearly indicates otherwise. The terms "comprises" and/or "comprising," when used in the specification, specify the presence of steps, operations, elements, and/or components, but do not preclude the presence or addition of one or more other steps, operations, elements, components, and/or groups thereof.

Unless otherwise defined, all terms (including technical and scientific terms) used in the specification should have the same meaning as commonly understood by those skilled in the art to which the inventive concept pertains. The terms, such as those defined in commonly used dictionaries, should not be interpreted in an idealized or overly formal sense unless expressly so defined herein. The same reference numerals represent the same elements throughout the specification.

FIG. 1 is a block diagram illustrating an electronic device 100 using homomorphic encryption (HE) according to an embodiment of the inventive concept. The electronic device 100 disclosed in FIG. 1 may encrypt specific data by using homomorphic encryption and may process the encrypted data.

Referring to FIG. 1, according to an embodiment of the inventive concept, the electronic device 100 using the homomorphic encryption may include an application processing unit (APU) 110, an isolated execution environment (IEE) 140, a non-volatile memory 150, a memory 160, and a data input device 170. The APU 110 may include a core 120 and a homomorphic encryption accelerator 130. The core 120 and homomorphic encryption accelerator 130 may be individual processing units of the APU 110, each of which reads and executes program instructions.

The APU 110 may comprise a general-purpose processor and may drive an operating system or an application program. Also, the APU 110 may control a plurality of hardware components connected with the APU 110, may execute various software components, and may perform processing and computing on various kinds of data including multimedia data. In some embodiments, the APU 110 may be implemented with a system-on-chip (SoC).

The core 120 may control the homomorphic encryption accelerator 130 for the purpose of encrypting data input to the electronic device 100 and processing the encrypted data. The homomorphic encryption accelerator 130 may be designed to more efficiently perform computationally intensive cryptographic operations. Also, the core 120 may control the non-volatile memory 150 for the purpose of storing the encrypted data and utilizing the stored data.

The homomorphic encryption accelerator 130 may accelerate a speed at which the data input to the electronic device 100 are processed and interpreted. A homomorphic encryption technology is advantageous in that data are stored, transmitted, and used at a high level of security. However, because the size of a key for encryption is relatively large, the homomorphic encryption technology is disadvantageous in that a processing speed is slower, as much as hundreds to thousands times, when compared to a speed at which plain data are interpreted. Accordingly, the homomorphic encryption accelerator 130 may accelerate a speed at which homomorphic encryption of data is performed and the encrypted data is processed, thus making it possible to implement homomorphic encryption more efficiently.

The IEE 140 means a hardware isolated zone for the purpose of performing homomorphic encryption on the input data. The IEE 140 may be an independent component from the other components of the electronic device 100. For example, the IEE 140 and may include a separate processor and a separate memory such that is comprised of hardware that is independent from the hardware of the other hardware of the other components of the electronic device 100 (i.e., "hardware independent"). The IEE 140 may generate a secret key and a public key necessary for homomorphic encryption of data. The secret key generated by the IEE 140 may be stored within the IEE 140. The public key may be generated based on the secret key, and the generated public key may be transferred to the outside of the IEE 140 for the purpose of homomorphic encryption of data and computation of the homomorphic encrypted data.

The non-volatile memory 150 may store data that are used by the electronic device 100. The non-volatile memory 150 may include at least one of a NAND flash memory, a programmable read only memory (PROM), an erasable and programmable ROM (EPROM), an electrically erasable and programmable ROM (EEPROM), a one-time programmable ROM (OTPROM), and a mask ROM. An example is illustrated in FIG. 1 as the non-volatile memory 150 is embedded in the electronic device 100, but the non-volatile memory 150 may be implemented in the form of an external memory.

The memory 160 may store data received from the outside. The memory 160 may be a working memory of the electronic device 100. The memory 160 may include at least one of a dynamic random access memory (DRAM), a synchronous DRAM (SDRAM), a static RAM (SRAM), a phase-change RAM (PRAM), a magnetic RAM (MRAM), a ferroelectric RAM (FRAM), a resistive RAM (RRAM), and a flash memory.

The data input device 170 may receive data from the outside. The data input device 170 may include a keyboard, a keypad, a touch panel, a mouse, a microphone, a sensor, a camera, and the like. An example is illustrated in FIG. 1 as the electronic device 100 includes the data input device 170. However, in another embodiment, the electronic device 100 may further include a data output device that outputs data processed within the electronic device 100.

In FIG. 1, the data input device 170 may receive data requiring a high level of security. The core 120 may provide the IEE 140 with a command for generating keys necessary for homomorphic encryption of data. The keys necessary for homomorphic encryption may include a secret key and a public key, and a secret key generation command and a public key generation command may be transmitted to the IEE 140 simultaneously or sequentially. In the case where the secret key generation command and the public key generation command are sequentially transmitted to the IEE 140, the secret key generation command may be transmitted prior to the public key generation command.

The IEE 140 that receives the command for generating a secret key may generate a secret key for homomorphic encryption. When the secret key is generated, the IEE 140 may block access from the core 120 to the IEE 140 for the purpose of preventing the secret key from being leaked out. Alternatively, after the IEE 140 transfers the public key to the core 120 depending on a procedure to be described below, the IEE 140 may block access from the core 120 to the IEE 140. After the IEE 140 blocks the access from the core 120, a separate authentication procedure in which the IEE 140 releases the blocking of the access from the core 120 may exist. The secret key may be stored in the hardware independent IEE 140 for the purpose of preventing the secret key from being leaked out to the outside.

The IEE 140 may generate the public key based on the secret key. The public key may be stored in a normal region of the electronic device 100 for the purpose of performing homomorphic encryption on input data. For example, the public key may be stored in the non-volatile memory 150 included in the electronic device 100. In an embodiment, the public key may include an encryption key, a multiplication key, a rotation key, and a conjugate key. The encryption key may be used for encryption of input data. The multiplication key may be used for computation of a ciphertext. The rotation key and the conjugate key may be used for boot-strapping to remove noise occurring in the process of encryption. The boot-strapping means a rebooting process for removing noise that is increased in amount as a homomorphic encryption operation is performed several times. How the IEE 140 generates a key will be more fully described with reference to FIG. 2.

The core 120 may request the public key generated by the IEE 140. The IEE 140 may transfer the public key to the outside in compliance with a mailbox protocol. Alternatively, in compliance with the mailbox protocol, the core 120 may request the IEE 140 to load the public key. When the public key request is received from a mailbox, the IEE 140 may transfer the public key to the outside through the mailbox. The public key transferred to the outside may be stored in the non-volatile memory 150. The public key may be classified depending on a size, an access frequency, a kind, and the like and may be stored in the non-volatile memory 150. A way to classify and store a public key will be more fully described with reference to FIGS. 4 and 5.

Data input to the electronic device 100 may be homomorphic encrypted by using an encryption key being a kind of public key. Based on the degree of demand on a security level, the electronic device 100 may select a portion of the input data and may homomorphic encrypt the selected portion. That is, the portion of the input data may be encrypted by using homomorphic encryption, and another portion may be encrypted by using symmetric key encryption or asymmetric key encryption, and the other portion being data not requiring security may not go through an encryption process. The homomorphic encrypted data, the data encrypted by using an existing encryption scheme, and the data not encrypted may be classified depending on sizes, access frequencies, kinds, and the like and may be stored in the non-volatile memory 150. A way to classify and store the data will be more fully described with reference to FIGS. 4 and 5.

The electronic device 100 according to the inventive concept may generate a secret key and a public key at the IEE 140 being a hardware isolated zone and may store the secret key in the IEE 140, thus reducing a risk of data leakage through a network and providing a high level of security. Also, the electronic device 100 may classify a public key, a ciphertext, and any other data depending on sizes, access frequencies, kinds, and the like and may store the classified result in the non-volatile memory 150, thus preventing data processing from being delayed and improving performance of processing encrypted data.

Also, the electronic device 100 according to the inventive concept may perform homomorphic encryption complying with a learning with errors (LWE)-based encryption technique. In particular, the electronic device 100 may implement computation more efficiently through homomorphic encryption complying with a ring learning with errors (RLWE)-based encryption technique. In the specification, the electronic device 100 according to the inventive concept will be described as examples in which the electronic device 100 changes a complex plaintext to polynomial computation depending on the RLWE-based encryption technique and performs computation, but this is only an example. A kind of an encryption technique to be applied to the inventive concept is not limited.

Figure 2:
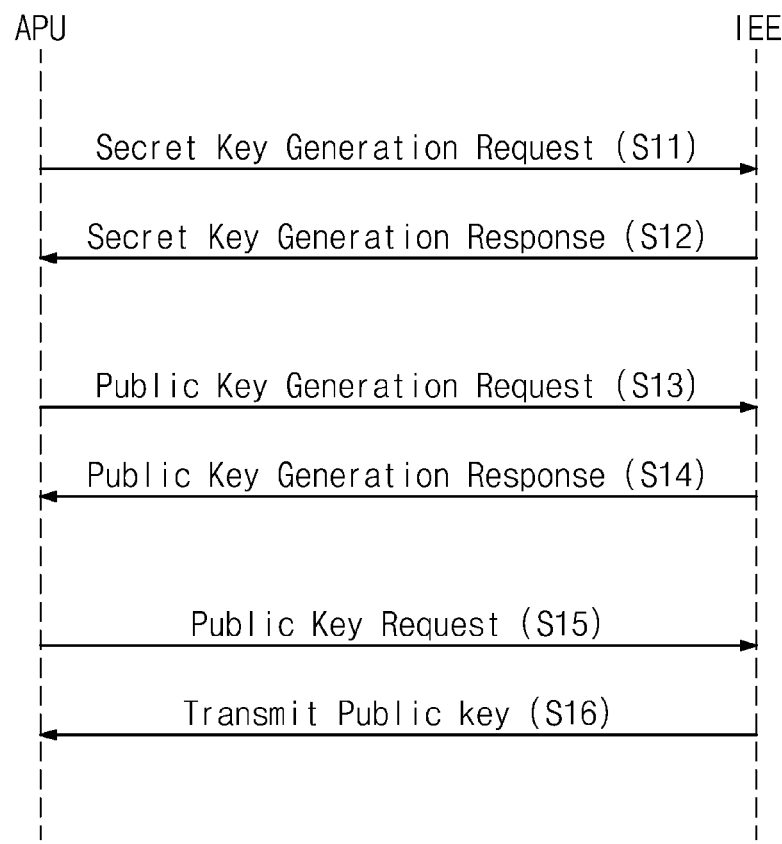
FIG. 2 is a diagram illustrating how an electronic device according to an embodiment of the inventive concept generates an encryption key.

FIG. 2 is a diagram illustrating how the electronic device 100 (refer to FIG. 1) according to an embodiment of the inventive concept generates an encryption key. The electronic device 100 according to an embodiment of the inventive concept may internally generate a key to be used in a homomorphic encryption system for the purpose of performing homomorphic encryption and processing encrypted data internally.

The core 120 (refer to FIG. 1) of the electronic device 100 may transmit the secret key generation command to the IEE 140 (refer to FIG. 1) (S11). When IEE 140 receives the secret key generation command from the core 120, the IEE 140 may generate a secret key $s(x)$ based on a polynomial element sampled from a Gaussian distribution $\chi_\sigma$. The secret key $s(x)$ means a polynomial of degree n in which coefficients consist of "−1", "0", "1". When the secret key $s(x)$ is generated, the IEE 140 may transmit a secret key generation response to the core 120. The secret key $s(x)$ thus generated may be stored in an independent region of the IEE 140.

Also, the core 120 may transmit the public key generation command to the IEE 140 (S13). When the IEE 140 receives the public key generation command from the core 120, the IEE 140 may generate a public key based on the secret key s(x) by using a homomorphic encryption algorithm. The public key may be composed of (a(x), b(x)) being in the form of a polynomial ordered pair in the RLWE-based encryption technique. A first random polynomial a(x) may be determined based on a uniform distribution, and a second random polynomial b(x) may be determined by Equation 1 below.

$$b(x)=-a(x)s(x)+e(x)$$ [Equation 1]

In Equation 1, a(x) means a first random polynomial determined based on the uniform distribution, and s(x) means a secret key generated at the IEE 140. e(x) may be determined based on an error extracted from a discrete Gaussian distribution. The first random polynomial a(x), the second random polynomial b(x), and e(x) may be polynomials of degree N in which a coefficient is a q-bit, and a key generation process may be expressed by Equation 2 below.

$$\text{Key Generation}(N,q) \rightarrow (\text{Secret Key}:=s(x), \text{Public Key}:=(a(x),b(x)))$$ [Equation 2]

When the public key is generated, the IEE 140 may transmit a public key generation response to the core 120 (S14). When a public key transmission command is received from the core 120 (S15), the IEE 140 may transmit the public key to the outside of the IEE 140 through the mailbox protocol (S16). Alternatively, without a separate command from the core 120, the IEE 140 may transmit the public key to the outside of the IEE 140 (e.g., the core 120) through the mailbox protocol based on the public key generation response.

An example is illustrated in FIG. 2 as the core 120, included in the APU 110, transmits the secret key generation command and the public key generation command to the IEE 140 independently or sequentially, but the core 120 may transmit the secret key generation command and the public key generation command to the IEE 140 at the same time. In the case where the secret key generation command and the public key generation command are transmitted at the same time, the IEE 140 may generate a secret key and may then generate a public key based on the secret key.

Figure 3:
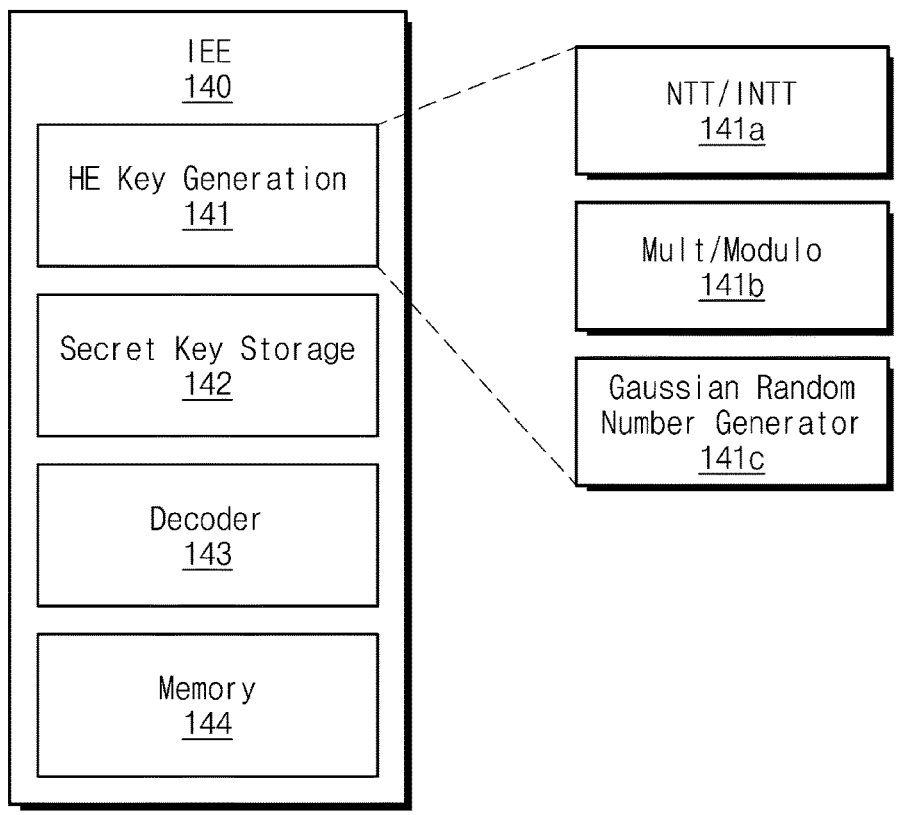
FIG. 3 is a block diagram illustrating a configuration of an IEE illustrated in FIG. 1.

FIG. 3 is a block diagram illustrating a configuration of the IEE 140 illustrated in FIG. 1. Referring to FIG. 3, the IEE 140 may include a homomorphic encryption key generator 141, secret key storage 142, a decoder 143, and a memory 144. The homomorphic encryption key generator 141 may generate a secret key and a public key, which are necessary for homomorphic encryption and encrypted data processing, in response to a request of the core 120 (refer to FIG. 1). The secret key and the public key may be generated depending on a series of processes described with reference to FIG. 2. The public key may include an encryption key for encrypting a plaintext to a ciphertext, a multiplication key for performing computation on the ciphertext, a rotation key and a conjugate key for boot-strapping, and the like.

The secret key storage 142 may store the secret key generated by the homomorphic encryption key generator 141. Because the homomorphic encryption is computed in a state where encrypted data are not decrypted, the homomorphic encryption does not require an access to the secret key for the purpose of processing the encrypted data. However, the homomorphic encryption uses the secret key only in the case where decryption is required to check a result value. Accordingly, the electronic device 100 (refer to FIG. 1) according to an embodiment of the inventive concept may prevent an access from the outside and the leakage of the secret key to the outside by storing the secret key in the secret key storage 142 of the IEE 140, which is physically isolated from the other components of the electronic device.

The decoder 143 may decode a result value of a homomorphic encryption form, obtained by processing the encrypted data at the electronic device 100 according to the inventive concept, to data of a plaintext form. The decoder 143 may decode the result value of the homomorphic encryption form based on the secret key stored in the secret key storage 142. The result value of the homomorphic encryption form may be input to the decoder 143 through the mailbox protocol, and a result value obtained after the decoder 143 decodes the input may be transferred to the outside of the IEE 140 through the mailbox protocol.

The memory 144 may be a working memory of the IEE 140. The homomorphic encryption key generator 141 may generate a secret key and a public key by using the memory 144. The decoder 143 may perform decryption by using the memory 144 and may store a result of the decryption in the memory 144.

The IEE 140 may further include additional components configured to process the decryption result. The IEE 140 may further include an interface for providing a result of processing the decryption result. Alternatively, the IEE 140 may further include an interface for providing the decryption result or the processing result to the core 120.

According to an embodiment of the inventive concept, because the electronic device 100 utilizes the RLWE-based encryption technique, the electronic device 100 may perform polynomial multiplication, polynomial addition, modulo reduction, and the like on a ring $R_q$. For an arithmetic operation of a ring, the homomorphic encryption key generator 141 may include an NTT/INTT (Number Theoretic Transform/Inverse Number Theoretic Transform) computing unit 141*a*, a Mult/Modulo (Multiplication/Modulo) computing unit 141*b*, and a Gaussian random number generator 141*c*.

The NTT/INTT computing unit 141*a* may provide an NTT/INTT-based algorithm for performing polynomial multiplication in RLWE-based homomorphic encryption computation. Because the polynomial multiplication of the ring requires an arithmetic process in which a long processing time is necessary, the polynomial multiplication of the ring may be efficiently performed through the NTT/INTT-based algorithm. Two polynomials above the ring may mean a(x) and b(x) obtained through Equation 2 above and may be expressed by Equation 3 below.

$$a(x)=a_0+a_1x+a_2x^2+\ldots+a_{n-1}x^{n-1}, b(x)=b_0+b_1x+b_2x^2+\ldots+b_{n-1}x^{n-1}$$ [Equation 3]

For multiplication of the polynomials a(x) and b(x), NTT computation and INTT computation for a(x) and b(x) may be individually performed. The NTT computation and the INTT computation are respectively expressed by Equation 4 and Equation 5 below.

$$A_j = \sum_{j=0}^{n-1} a_j w_n^{ij} \bmod q, \text{ for } i = 0, 1, \ldots, n-1$$ [Equation 4]

$$a_j = n^{-1}\sum_{j=0}^{n-1} A_j w_n^{-ij} \bmod q, \text{ for } i = 0, 1, \ldots, n-1$$ [Equation 5]

In Equation 4 and Equation 5, "a" means a coefficient of the polynomial a(x), and "n" means an nth root of 1. Also, "n" may satisfy an equation of "1 mod q", and "w" may also consist of a number satisfying the equation of "1 mod q". That is, "n" and "w" may consist of a number satisfying a condition of $n \times n^{-1} \equiv 1$ mod q and $w \times w^{-1} \equiv 1$ mod q.

The Mult/Modulo computing unit 141b may perform multiplication and modular arithmetic on the NTT results of the polynomials a(x) and b(x). Point-wise multiplication may be used when the NTT results are multiplied. As such, coefficients of the same degree may be multiplied together. A result of the point-wise multiplication may be used to obtain a final result of multiplying the polynomials a(x) and b(x) together through the INTT computation. Modular reduction may be accompanied such that a result value satisfies a condition of the ring in the above computations. NTT-based polynomial multiplication may be expressed by Equation 6 below.

$$C = \text{INTT}(\text{NTT}(a(x)) \cdot \text{NTT}(b(x))) \quad \text{[Equation 6]}$$

The Gaussian random number generator 141c may provide a random number for generating a key and computing a ciphertext. Because the RLWE-based homomorphic encryption requires a polynomial sampled from a discrete Gaussian distribution having a standard deviation, the Gaussian random number generator 141c may perform discrete Gaussian sampling to generate a random number. Rejection sampling and inversion sampling may be used to perform the discrete Gaussian sampling. In this case, to reduce complexity through an approximation uniform pseudo random distribution, and the Gaussian random number generator 141c may select a linear feedback shift register (LFSR) to generate a random number.

Figure 4:
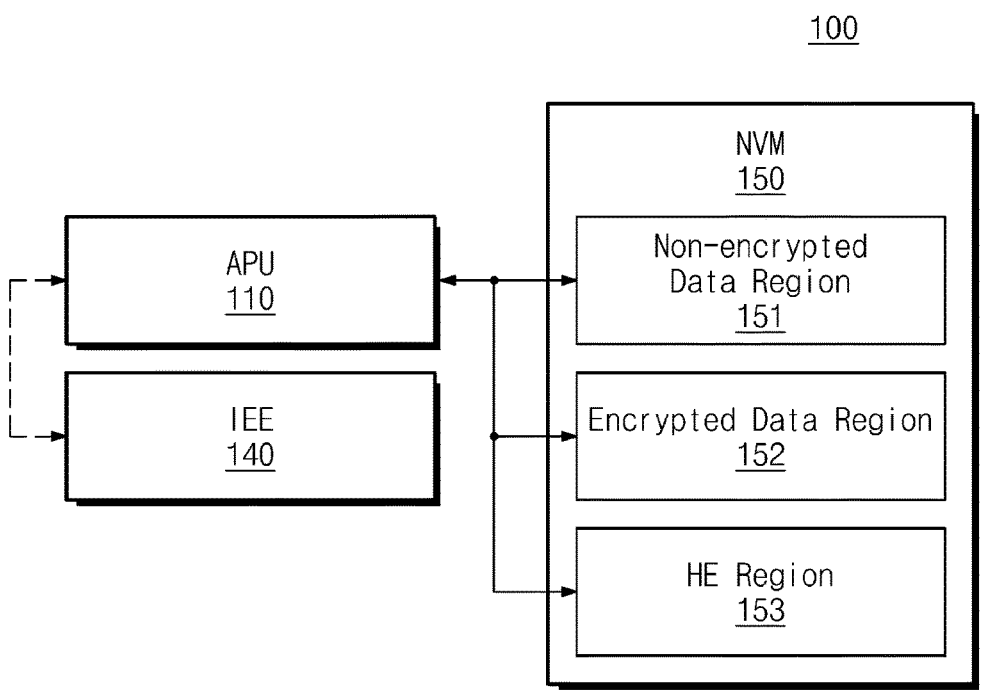
FIG. 4 is a diagram indicating regions of a non-volatile memory for classifying and storing encrypted data generated at an electronic device according to an embodiment of the inventive concept.

FIG. 4 is a diagram indicating regions of the non-volatile memory 150 for classifying and storing encrypted data generated at the electronic device 100 according to an embodiment of the inventive concept. The non-volatile memory 150 may include a non-encrypted data region 151, an encrypted data region 152, and a homomorphic encryption data region 153. The non-encrypted data region 151, the encrypted data region 152, and the homomorphic encryption data region 153 refer to spaces of the non-volatile memory 150, which are logically or physically separated from each other. Because a public key and homomorphic encrypted data that are used in homomorphic encryption are larger in size than a plaintext, a speed at which the public key and the homomorphic encrypted data are processed is slow. Accordingly, the electronic device 100 according to the inventive concept may prevent data processing from being delayed by storing data in separated spaces depending on the kind (e.g., encryption form) of data. For example, the kind of data may include non-encrypted data, encrypted data, and homomorphic encrypted data.

The non-encrypted data region 151 is a region for storing data not requiring security (i.e., non-encrypted data) from among pieces of data input to the electronic device 100. The encrypted data region 152 is a region for storing data obtained by encrypting data (i.e., encrypted data), which does not require a high level of security but requires storing the data in an encryption form, by using a method different from a homomorphic encryption method. The electronic device 100 may store data, which are encrypted by an encryption algorithm such as an AES encryption algorithm or an RSA encryption algorithm, in the encrypted data region 152. The homomorphic encryption data region 153 is a region for storing data obtained by performing homomorphic encryption on data (i.e., homomorphic encrypted data) requiring a high level of security in the electronic device 100. A method for homomorphic encrypting data will be more fully described with reference to FIG. 6.

Figure 5:
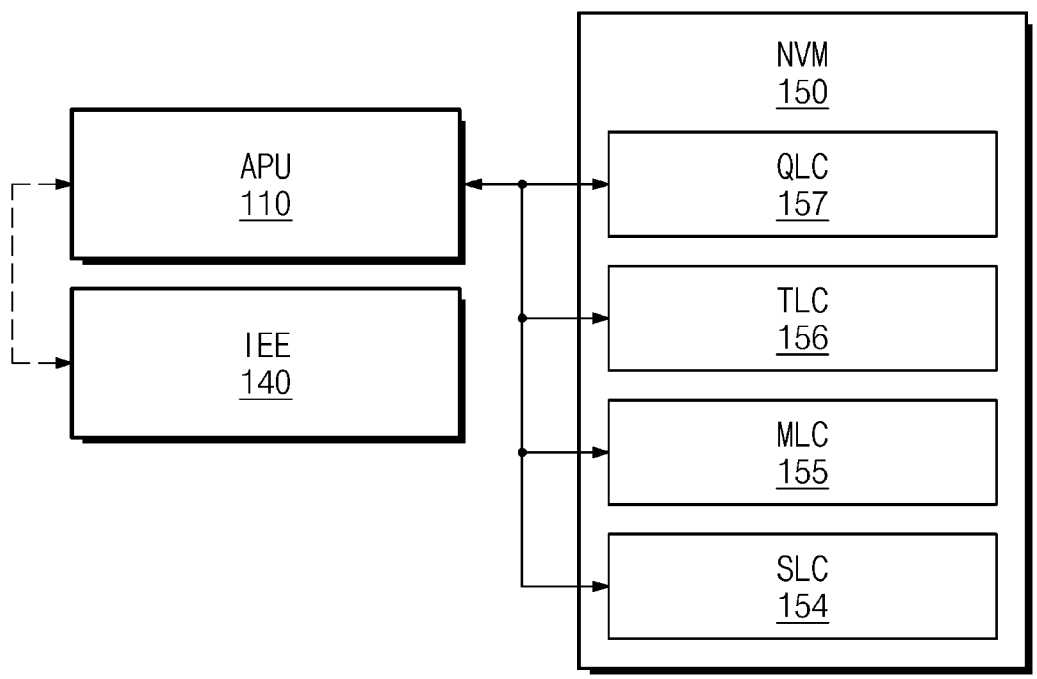
FIG. 5 is a diagram illustrating a way to classify encrypted data generated according to an embodiment of the inventive concept.

FIG. 5 is a diagram illustrating a way to classify encrypted data generated according to an embodiment of the inventive concept. The non-volatile memory 150 of FIG. 5 may include different regions, such as a single level cell (SLC) 154, a multi-level cell (MLC) 155, a triple level cell (TLC) 156, and a quad level cell (QLC) 157. Each of the different regions may be configured as the SLC 154, the MLC 155, the TLC 156, or the QLC 157 by a control logic circuit (not shown) of the memory. The SLC 154, the MLC 155, the TLC 156, or the QLC 157 may be included in each of the non-encrypted data region 151, the encrypted data region 152, and the homomorphic encryption data region 153 described with reference to FIG. 4. The QLC 157 includes a cell higher in level than the SLC 154, the MLC 155, and the TLC 156. The TLC 156 includes a cell higher in level than the SLC 154 and the MLC 155. The MLC 155 includes a cell higher in level than the SLC 154. Pieces of data stored in the non-volatile memory 150 may be classified depending on the kind of data as described with reference to FIG. 4 and may then be classified depending on size and access frequency.

For example, the homomorphic encryption data region 153 may include the SLC 154, the MLC 155, the TLC 156, or the QLC 157. Homomorphic encrypted data and a public key may be stored in the homomorphic encryption data region 153. As sizes of homomorphic encrypted data and a public key become larger, a level of cell for storing the homomorphic encrypted data and the public key may become higher. As access frequencies of homomorphic encrypted data and a public key become greater, a level of cell for storing the homomorphic encrypted data and the public key may become lower. As a speed at which homomorphic encrypted data and a public key are accessed increases, a level of cell for storing the homomorphic encrypted data and the public key may become lower. Also, in the case where an access frequency and a required speed associated with homomorphic encrypted data and a public key change, a level of cell for storing the homomorphic encrypted data and the public key may change.

In detail, data having a relatively small size or requiring fast computation from among pieces of homomorphic encrypted data may be stored in the SLC 154. Data having a relatively large size or not requiring fast computation from among the pieces of homomorphic encrypted data may be stored in the MLC 155. Also, the multiplication key necessary for multiplication from among the above keys included in the public key may be stored in the TLC 156. The encryption key necessary for encryption of data from among the above keys included in the public key may be stored in the QLC 157.

For another example, the encrypted data region 152 may include the SLC 154, the MLC 155, and the TLC 156. Data encrypted through a method different from a homomorphic encryption method and a public key may be stored in the encrypted data region 152. Data having a relatively small size or requiring fast computation from among pieces of encrypted data may be stored in the SLC 154. Data having a relatively large size or not requiring fast computation from among the pieces of encrypted data may be stored in the MLC 155.

The electronic device 100 according to the inventive concept may implement selective homomorphic encryption depending on a required security level of data as described with reference to FIGS. 4 and 5. The electronic device 100 may classify and store non-encrypted data, encrypted data, and homomorphic encrypted data generated through the selective homomorphic encryption, thus preventing data processing from being delayed and improving performance of processing encrypted data.

Figure 6:
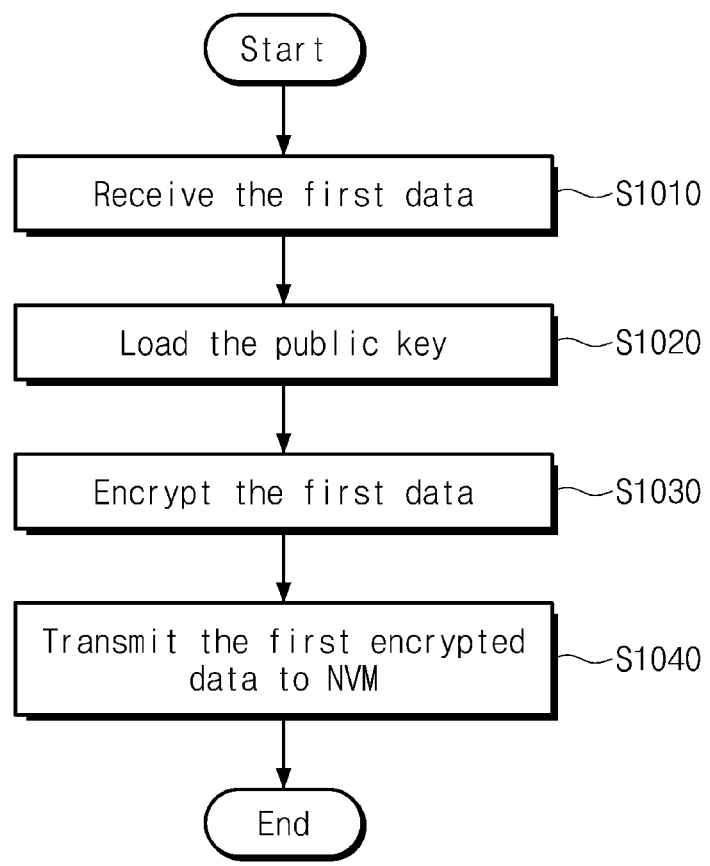
FIG. 6 is a flowchart illustrating a data encryption method of an electronic device according to an embodiment of the inventive concept.

FIG. 6 is a flowchart illustrating a data encryption method of the electronic device 100 (refer to FIG. 1) according to an embodiment of the inventive concept.

In operation S1010, the electronic device 100 according to an embodiment of the inventive concept may receive first data targeted for homomorphic encryption. When the first data being an encryption target are received, for homomorphic encryption of the first data, the core 120 (refer to FIG. 1) may command the IEE 140 to generate a key. The IEE 140 may receive the command from the core 120 and may generate a secret key, and a public key based on the secret key. When the keys are generated, the IEE 140 may transmit a key generation response to the core 120 to provide notification that the keys are generated. When the key generation response is received, the core 120 may request the public key from the IEE 140. The IEE 140 may transfer the public key to the outside of the IEE 140 through the mailbox protocol. The public key transferred to the outside of the IEE 140 may be stored in the non-volatile memory 150 (refer to FIG. 1).

In operation S1020, the APU 110 (refer to FIG. 1) may load the public key through the mailbox protocol. The public key may include an encryption key, a multiplication key, a rotation key, and the like. Also, together with transferring the public key, the IEE 140 may store the secret key in the secret key storage 142 (refer to FIG. 3) of the IEE 140 and may block access from the core 120. Alternatively, in the case where the public key is in advance stored in the non-volatile memory 150, the APU 110 may load the public key stored in the non-volatile memory 150 without requesting the public key from the IEE 140.

In operation S1030, the APU 110 may perform homomorphic encryption on the first data by using the encryption key included in the public key. For example, the RLWE encryption system may be used to encrypt the first data. In the RLWE encryption system, the first data targeted for encryption may be encrypted to ciphertext C being first encrypted data, and the ciphertext C may be composed of $(C_0(x), C_1(x))$ being a polynomial ordered pair. The encryption of the first data may be expressed by Equation 7 below.

$$\text{Encryption}(d, pk) \rightarrow C = (C_0(x), C_1(x)) = (e_1(x)a(x) + e_2(x), e_1(x)b(x) + m(x) + e_3(x))$$ [Equation 7]

In Equation 7, "d" means data targeted for encryption, and "pk" means a public key generated at the IEE 140. As described with reference to FIG. 2, $a(x)$ means a first random polynomial determined based on a uniform distribution, and $b(x)$ means a second random polynomial determined based on $e(x)$, which is determined based on a secret key and an error extracted from a discrete Gaussian distribution. $m(x)$ means a polynomial element obtained by encoding first data. $e_1(x)$, $e_2(x)$, and $e_3(x)$ means three error polynomial elements generated from the discrete Gaussian distribution. The homomorphic encryption accelerator 130 may accelerate an encryption speed in the process of homomorphic encryption of the first data.

In operation S1040, the APU 110 may transmit first encrypted data to the non-volatile memory 150. The first encrypted data may be stored in the homomorphic encryption data region 153 (refer to FIG. 4) of the non-volatile memory 150. The first encrypted data that are homomorphic encrypted data may be classified depending on a size, an access frequency, and a required computing speed of a ciphertext and may be stored in the homomorphic encryption data region 153. For example, in the case where a ciphertext is of a relatively small size or requires fast computation, the ciphertext may be stored in a cell of a relative low level in the homomorphic encryption data region 153. Alternatively, in the case where a ciphertext is of a relatively large size or does not require fast computation, the ciphertext may be stored in a cell of a relative high level in the homomorphic encryption data region 153.

Figure 7:
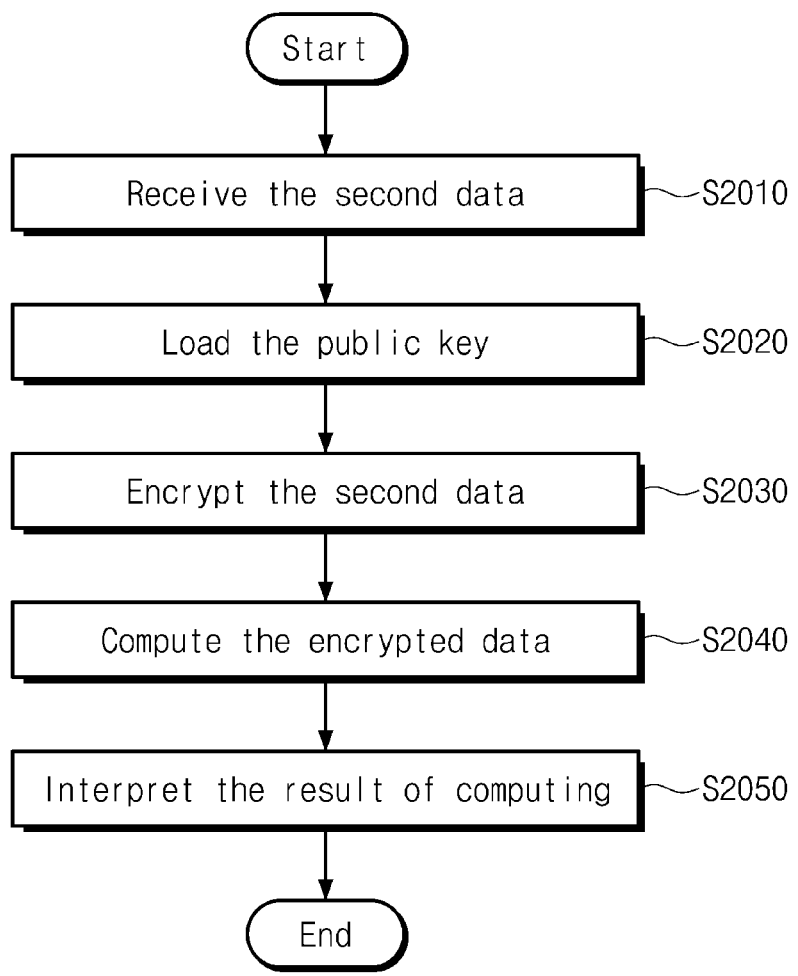
FIG. 7 is a flowchart illustrating an encrypted data processing method of an electronic device according to an embodiment of the inventive concept.

FIG. 7 is a flowchart illustrating an encrypted data processing method of the electronic device 100 (refer to FIG. 1) according to an embodiment of the inventive concept. The encrypted data processing method disclosed in FIG. 7 corresponds to a data computing method capable of following the encryption process described with reference to FIG. 6.

In operation S2010, the electronic device 100 according to an embodiment of the inventive concept may receive second data targeted for data processing from the data input device 170 (refer to FIG. 1). The second data may be targeted for homomorphic encryption for computation with the first encrypted data stored in the non-volatile memory 150 (refer to FIG. 1) in the encryption process described with reference to FIG. 6.

In operation S2020, the APU 110 (refer to FIG. 1) may load the public key stored in the non-volatile memory 150 in operation S1010 described with reference to FIG. 6. The public key may include an encryption key, a multiplication key, a rotation key, and the like. The encryption key may be used for homomorphic encryption of input data. The multiplication key may be used for computation of homomorphic encrypted data. The rotation key may be used for boot-strapping to remove a noise added in the process of encrypting data.

In operation S2030, the APU 110 may perform homomorphic encryption on the second data by using the same scheme as operation S1030 of FIG. 6. The APU 110 may generate the second encrypted data by performing homomorphic encryption on the second data based on the encryption key included in the public key. The homomorphic encryption accelerator 130 (refer to FIG. 1) may accelerate an encryption speed in the process of homomorphic encryption of the second encrypted data.

In operation S2040, to perform computation on the second encrypted data, the APU 110 may read the first encrypted data stored in the non-volatile memory 150 in operation S1010 described with reference to FIG. 6. The APU 110 may perform computation on the first encrypted data and the second encrypted data. Because the encrypted data processing method according to an embodiment of the inventive concept is capable of being performed based on a fully homomorphic encryption (FHE) system, addition and multiplication computation results may be simultaneously maintained, and thus, all kinds of computations, such as large and small comparison, sum, and multiplication, data analysis, AI learning, and the like may be performed.

In operation S2050, the electronic device 100 may interpret a computation result of the first encrypted data and the second encrypted data. Because an embodiment of the inventive concept is based on the homomorphic encryption system, a result of computing a ciphertext may be identical to a result of computing a plaintext. For example, the computation result of the first encrypted data and the second encrypted data may be identical to a result of performing homomorphic encryption on a computation result of a plaintext. Accordingly, a result of an operation that the electronic device 100 intends to perform may be drawn based on the computation result of the first encrypted data and the second encrypted data. For example, whether the first encrypted data and the second encrypted data coincide with each other may be determined.

Alternatively, the electronic device 100 may transmit the computation result of the first encrypted data and the second encrypted data to the IEE 140 (refer to FIG. 1) through the mailbox protocol and may decrypt the computation result through the secret key stored in the secret key storage 142 (refer to FIG. 3). The IEE 140 may transfer only a result of performing decryption based on the secret key to the outside through the mailbox protocol. That is, only a result of computing the first encrypted data and the second encrypted data may be transferred to the outside without the leakage of information about the first encrypted data and the second encrypted data input to the IEE 140, thus making it possible to prevent data information used at the electronic device 100 from being leaked out.

Figure 8:
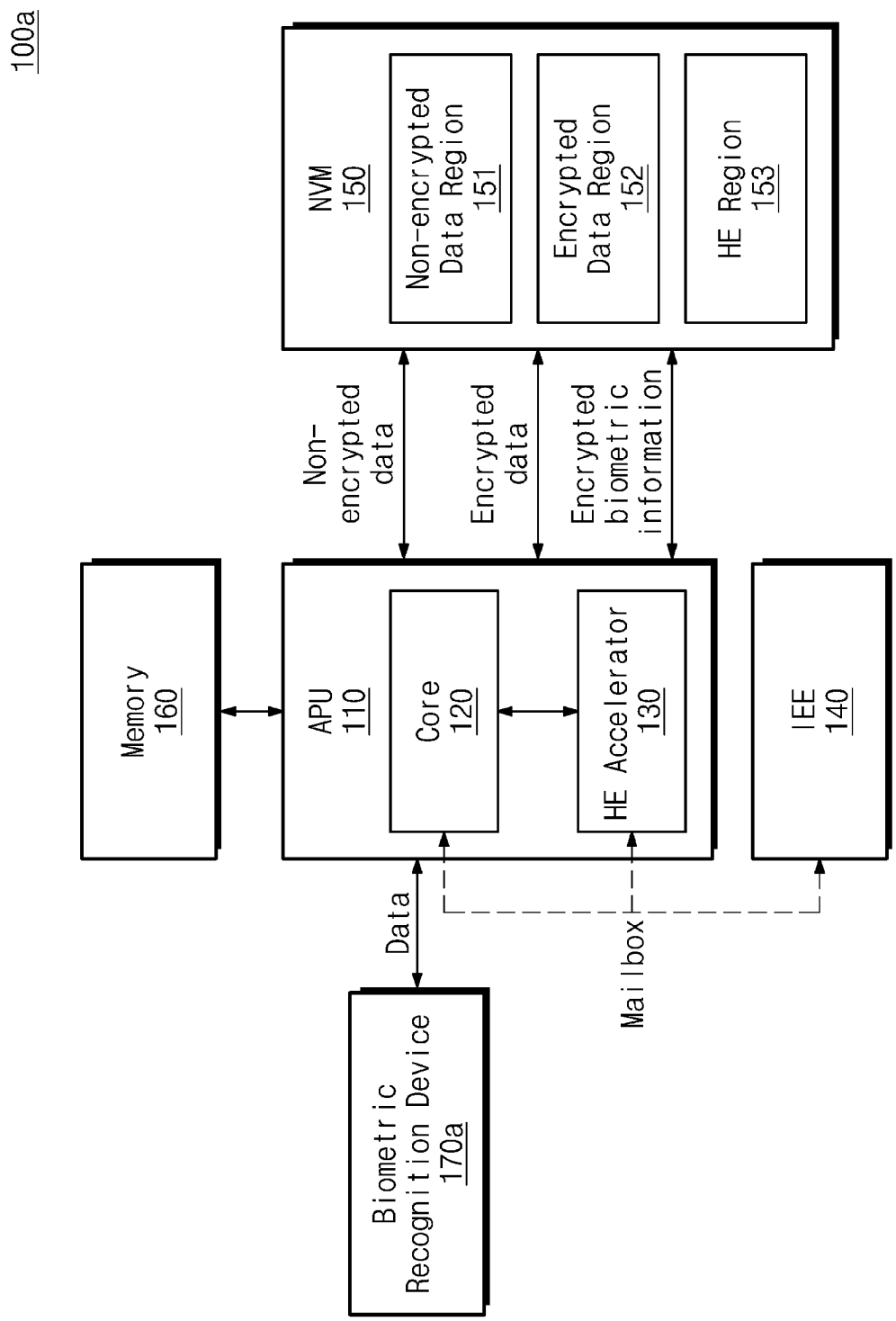
FIG. 8 is a block diagram illustrating an electronic device providing a biometric authentication function using an electronic device according to an embodiment of the inventive concept.

FIG. 8 is a block diagram illustrating an electronic device 100*a* providing a biometric authentication function using an electronic device according to an embodiment of the inventive concept. The electronic device 100*a* that provides a biometric authentication function may include the APU 110, the IEE 140, the non-volatile memory 150, the memory 160, and a biometric recognition device 170*a*. The APU 110 may include the core 120 and the homomorphic encryption accelerator 130. Below, in the electronic device 100*a* with the biometric authentication function disclosed in FIG. 8, additional description associated with the components, functions, characteristics, and operations described with reference to FIGS. 1 to 7 will be omitted to avoid redundancy.

The electronic device 100*a* with the biometric authentication function may determine whether registered biometric information and input biometric information coincide with each other. In the electronic device 100*a* with the biometric authentication function, biometric information corresponds to information necessary for protection. Accordingly, pieces of biometric information that are registered at and are input to the electronic device 100*a* with the biometric authentication function may be homomorphic encrypted, and thus, the biometric information may be protected.

In the electronic device 100*a* with the biometric authentication function, the biometric recognition device 170*a* may receive biometric information for biometric authentication as data. For example, the biometric recognition device 170*a* may receive information about a body, such as a fingerprint, a face, an iris, a voice, and a vein, as data. The biometric recognition device 170*a* may transfer biometric information data to the APU 110.

The electronic device 100*a* with the biometric authentication function may register the biometric information input through the biometric recognition device 170*a* as an authentication reference, depending on the data encryption method disclosed in FIG. 6. Also, the electronic device 100*a* with the biometric authentication function may compare the biometric information input through the biometric recognition device 170*a* with the biometric information registered depending on the encrypted data processing method disclosed in FIG. 7 and may determine whether the input authentication information is authenticated. An operating method of the electronic device 100*a* with the biometric authentication function will be more fully described with reference to FIG. 9.

Figure 9:
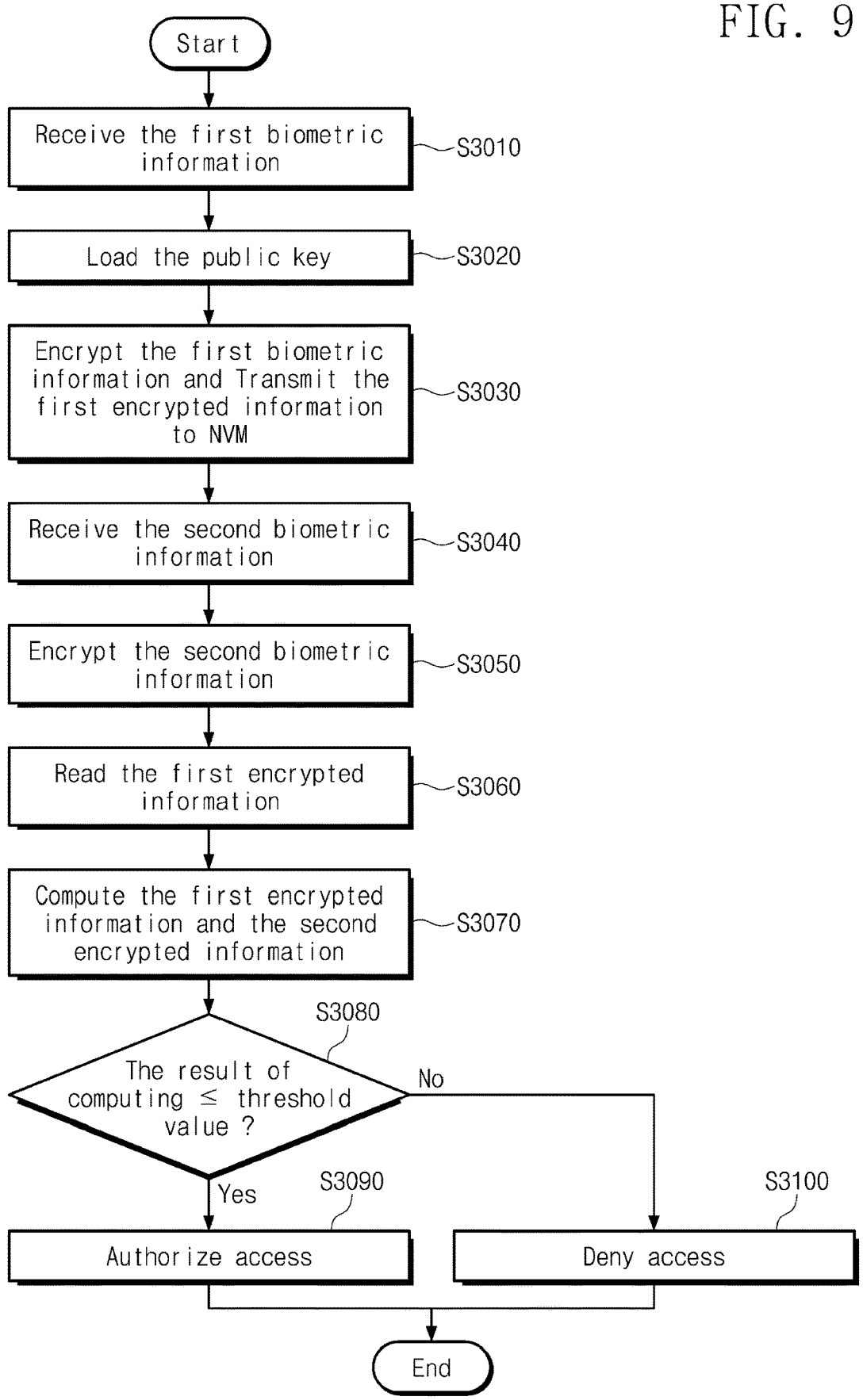
FIG. 9 is a flowchart illustrating an operating method of an electronic device providing a biometric authentication function disclosed in FIG. 8.

FIG. 9 is a flowchart illustrating an operating method of the electronic device 100*a* (refer to FIG. 8) providing a biometric authentication function disclosed in FIG. 8. In the operating method of the electronic device 100*a* with the biometric authentication function disclosed in FIG. 9, operation S3010 to operation S3030 correspond to a process of registering biometric information as an authentication reference, and operation S3040 to operation S3100 correspond to a process of determining whether input authentication information is authenticated.

In operation S3010, the biometric recognition device 170*a* (refer to FIG. 8) may receive first biometric information from the outside. The first biometric information may be information about a fingerprint, a face, an iris, or a vein of the user. The first biometric information means biometric information that is used as an authentication reference of the electronic device 100*a* with the biometric authentication function. The biometric recognition device 170*a* may transfer the first biometric information input from the outside to the APU 110 (refer to FIG. 8).

When the first biometric information is input to the APU 110, the core 120 (refer to FIG. 8) of the APU 110 may command the IEE 140 (refer to FIG. 8) to generate keys for the purpose of encrypting the first biometric information. The IEE 140 may generate a secret key depending on the command from the core 120 and may generate a public key based on the secret key. When the keys are generated, the IEE 140 may transmit a key generation response to the core 120 to provide notification that the keys are generated. When the key generation response is received, the core 120 may request the public key from the IEE 140. The IEE 140 may transfer the public key to the outside of the IEE 140 through the mailbox protocol.

In operation S3020, the APU 110 may load the public key generated at the IEE 140 through the mailbox protocol. Together with transferring the public key, the IEE 140 may store the secret key in the secret key storage 142 (refer to FIG. 3) of the IEE 140. Alternatively, in the case where the public key is in advance stored in the non-volatile memory 150 (refer to FIG. 8), the APU 110 may load the public key from the non-volatile memory 150. When the secret key is stored in the secret key storage 142, the IEE 140 may block an access from the core 120 to the IEE 140.

In operation S3030, the APU 110 may encrypt the first biometric information by using the encryption key included in the public key. The first biometric information may be homomorphic encrypted to first encrypted data. In this case, the homomorphic encryption accelerator 130 (refer to FIG. 8) of the APU 110 may improve an encryption speed. The first encrypted data may be transmitted to the non-volatile memory 150. The first encrypted data that are homomorphic encrypted may be stored in the homomorphic encryption data region 153 (refer to FIG. 8) of the non-volatile memory 150. Also, the public key that is used to homomorphic encrypt the first biometric information may be stored in the homomorphic encryption data region 153 of the non-volatile memory 150.

In contrast, in the electronic device 100*a* with the biometric authentication function, data, which do not require encryption, from among pieces of input data for operating the electronic device 100*a*, may be stored in the non-encrypted data region 151 (refer to FIG. 8) of the non-volatile memory 150 without an encryption process. Data that do not require a high level of security may be encrypted by an encryption algorithm, which is different from homomorphic encryption, such as an AES encryption algorithm or an RSA encryption algorithm, and the data thus encrypted may be stored in the encrypted data region 152 of the non-volatile memory 150.

In operation S3040, the biometric recognition device 170*a* may receive second biometric information from the outside. The second biometric information may also be information about a fingerprint, a face, an iris, or a vein of the user. The second biometric information means biometric information that is targeted for authentication of the electronic device 100a with the biometric authentication function. The biometric recognition device 170a may transfer the second biometric information input from the outside to the APU 110.

When the second biometric information is input to the APU 110, in operation S3050, the core 120 of the APU 110 may read the public key stored in the non-volatile memory 150 for the purpose of encrypting the second biometric information. The APU 110 may generate second encrypted data by performing homomorphic encryption on the second biometric information based on the public key.

In operation S3060, the APU 110 may read the first encrypted data for the purpose of authenticating the second encrypted data targeted for authentication. The first encrypted data that are data used as an authentication reference of the electronic device 100a with the biometric authentication function means data stored in the homomorphic encryption data region 153 of the non-volatile memory 150 in operation S3030.

In operation S3070, the APU 110 may compute the first encrypted data and the second encrypted data by using the multiplication key, the rotation key, and the like included in the public key. For example, the APU 110 may perform large and small comparison, sum, or multiplication on the first encrypted data and the second encrypted data. The APU 110 may transfer a result of computing the first encrypted data and the second encrypted data to the IEE 140 through the mailbox protocol.

In operation S3080, the IEE 140 may decode the computation result of the first encrypted data and the second encrypted data using the secret key stored in the secret key storage 142, and may compare the decoded computation result with a threshold value. The threshold value means a value that is stored in advance for the purpose of interpreting a data computation result at the electronic device 100a with the biometric authentication function. The threshold value may be stored in the memory 144 (refer to FIG. 3) included in the IEE 140.

When the decoded computation result is smaller than the threshold value, the electronic device 100a with the biometric authentication function may proceed to operation S3090 and may authorize an access to an electronic device in which the electronic device 100a with the biometric authentication function is included. When the decoded computation result is not smaller than the threshold value, the electronic device 100a with the biometric authentication function may proceed to operation S3100 and may deny access to the electronic device in which the electronic device 100a with the biometric authentication function is included.

Figure 10:
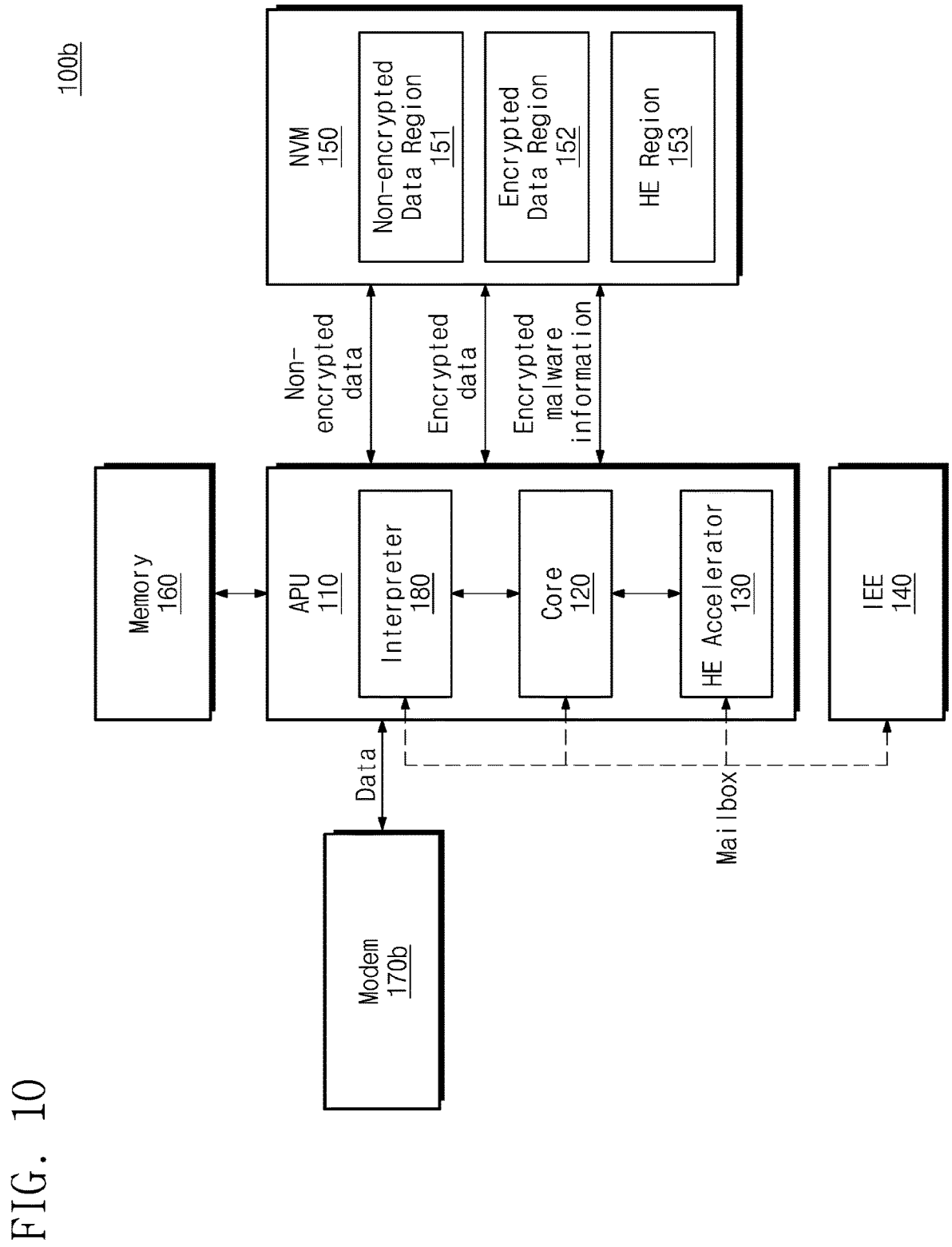
FIG. 10 is a block diagram illustrating an electronic device providing a malicious code determination function using an electronic device according to an embodiment of the inventive concept.

FIG. 10 is a block diagram illustrating an electronic device 100b providing a malicious code (or malware) determination function using an electronic device according to an embodiment of the inventive concept. The electronic device 100b that provides a malicious code determination function may include the APU 110, the IEE 140, the non-volatile memory 150, and a modem 170b. The APU 110 may include the core 120, the homomorphic encryption accelerator 130, and an interpreter 180. Below, in the electronic device 100b with the malicious code determination function disclosed in FIG. 10, additional description associated with the components, functions, characteristics, and operations described with reference to FIGS. 1 to 7 will be omitted to avoid redundancy.

The electronic device 100b with the malicious code determination function may determine whether information of a malicious code database and information of an input code coincide with each other. In the case where the malicious code database and the input code information processed at the electronic device 100b with the malicious code determination function are leaked out, any other malicious code may be implemented to avoid the measures of the electronic device 100b. Accordingly, in the electronic device 100b with the malicious code determination function, the malicious code database and the input code information may correspond to information necessary for protection. In the electronic device 100b with the malicious code determination function, the malicious code database and the input code information may be protected through homomorphic encryption and stored in the homomorphic encryption region 153 of the non-volatile memory 150.

In the electronic device 100b with the malicious code determination function, the modem 170b may communicate with an external device. For example, the modem 170b may communicate with the external device through wireless communication schemes such as long term evolution (LTE), global system for mobile communications (GSM), wireless fidelity (Wi-Fi), near field communication (NFC), and Bluetooth. As another example, the modem 170b may communicate with the external device through wired communication schemes such as Ethernet and data-over-cable service interface specifications (DOCSIS). That is, the modem 170b may be connected to a network through the wired or wireless communication and may communicate with the external device over the network.

The modem 170b may decode a signal received from the external device and may provide the decoded signal to an internal component of the electronic device 100b with the malicious code determination function. The signal received from the external device may include information about a malicious code input to the external device.

The interpreter 180 may extract feature information of a malicious code for the purpose of building a malicious code database from information about malicious codes and determining a malicious code. For example, the interpreter 180 may extract a signature of an input malicious code for the purpose of interpreting a feature of the malicious code. Alternatively, for a dynamic analysis of a malicious code, the interpreter 180 may extract abnormal behavior information of the input malicious code.

The electronic device 100b with the malicious code determination function may register (or add) the feature information (e.g., signature or abnormal behavior information) of the malicious code transferred from the interpreter 180 to a database depending on the data encryption method disclosed in FIG. 6.

Alternatively, the electronic device 100b with the malicious code determination function may receive a signature or abnormal behavior information encrypted depending on the data encryption method disclosed in FIG. 6 through the modem 170b. The electronic device 100 may register (or add) the encrypted signature or abnormal behavior information to the database. In this case, the electronic device 100b may provide a public key for encryption to the external device such that the encryption method of FIG. 6 is executed at the external device.

The interpreter 180 may monitor an operation of an operating system or an application. For example, the interpreter 180 may monitor whether a candidate access pattern occurs. The candidate access pattern may be, for example, a pattern of accesses that are irregularly made with respect to the memory 160 or the non-volatile memory 150 and are therefore likely to be an access of a malicious code. In the case where the candidate access pattern occurs at the application, the interpreter 180 may transmit information indicating the occurrence of the candidate access pattern to the core 120.

The electronic device 100b with the malicious code determination function may compare the candidate access pattern transferred from the interpreter 180 with the database registered feature information depending on the encrypted data processing method disclosed in FIG. 7 and may determine whether the candidate access pattern is associated with a malicious code. An operating method of the electronic device 100b with the malicious code determination function will be more fully described with reference to FIG. 12.

Figure 11:
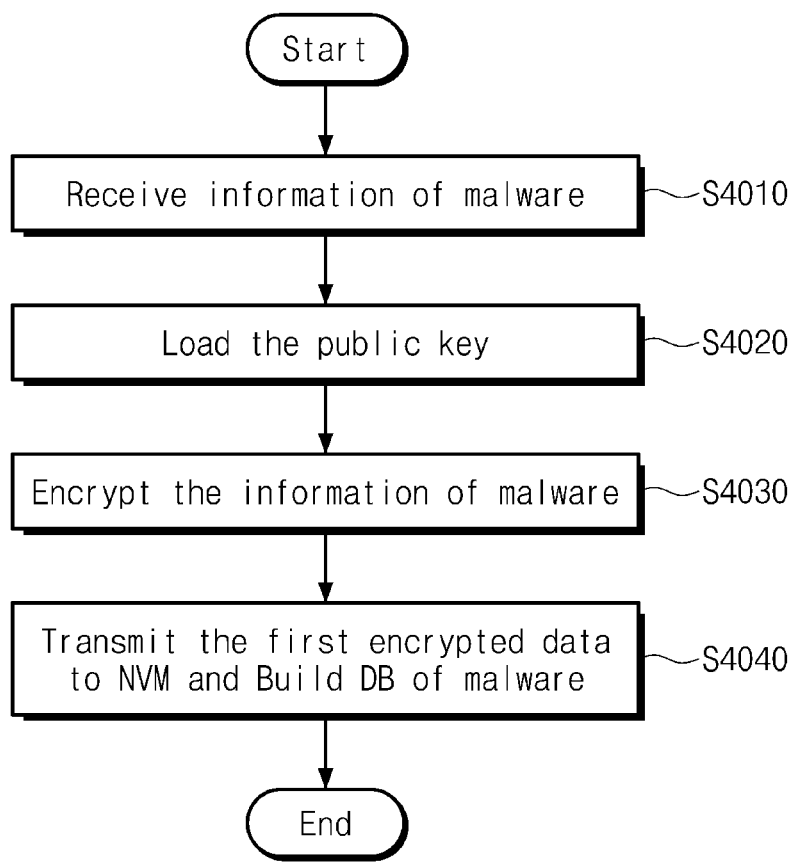
FIG. 11 is a flowchart illustrating a method of building a malicious code database at an electronic device with a malicious code determination function disclosed in FIG. 10.

FIG. 11 is a flowchart illustrating a method of building a malicious code database at the electronic device 100b (refer to FIG. 10) with the malicious code determination function disclosed in FIG. 10. The description will be given with reference to FIG. 11 as a process of building a database is performed with respect to one example of malicious code information. However, the database building method according to the inventive concept may implement the database building methods to be described with reference to FIG. 11 in parallel or sequentially and may finally build a database storing a huge amount of malicious code data. Also, data stored in the database may be additionally updated based on malicious code information newly received while the electronic device 100b with the malicious code determination function is operating.

In operation S4010, the APU 110 (refer to FIG. 10) may receive feature information of a malicious code from the modem 170b (refer to FIG. 10). The feature information of the malicious code may include signature information, abnormal behavior information, and the like. To encrypt the feature information of the malicious code, the core 120 may command the IEE 140 (refer to FIG. 10) to generate keys. The IEE 140 may generate a secret key depending on the command from the core 120 and may generate a public key based on the secret key. When the keys are generated, the IEE 140 may transmit a key generation response to the core 120 to provide notification that the keys are generated. When the key generation response is received, the core 120 may request the public key from the IEE 140. The IEE 140 may transfer the public key to the outside of the IEE 140 through the mailbox protocol.

In operation S4020, the APU 110 may read the public key generated at the IEE 140 through the mailbox protocol. Together with transferring the public key to the outside, the IEE 140 may store the secret key in the secret key storage 142 (refer to FIG. 3) of the IEE 140. In the case where the public key is in advance stored in the non-volatile memory 150 (refer to FIG. 10), the APU 110 may read the public key from the non-volatile memory 150. When the secret key is stored in the secret key storage 142, the IEE 140 may block access from the core 120 to the IEE 140.

In operation S4030, the APU 110 may encrypt the input feature information of the malicious code by using the encryption key included in the public key. The feature information of the malicious code may be homomorphic encrypted to first encrypted data. In this case, the homomorphic encryption accelerator 130 (refer to FIG. 10) of the APU 110 may improve an encryption speed.

In operation S4040, the first encrypted data may be transmitted to the non-volatile memory 150 (refer to FIG. 10). The first encrypted data that are homomorphic encrypted may be stored in the homomorphic encryption data region 153 (refer to FIG. 10) of the non-volatile memory 150. Also, the public key that is used to homomorphic encrypt the feature information of the malicious code may be stored in the homomorphic encryption data region 153 of the non-volatile memory 150. The first encrypted data stored in the homomorphic encryption data region 153 may be utilized as data of a database for determining a malicious code. The electronic device 100b with the malicious code determination function may build a database storing various malicious code data by implementing the database building methods disclosed in FIG. 11 in parallel or sequentially.

In contrast, in the electronic device 100b with the malicious code determination function, data, which do not require encryption, from among pieces of input data for operating the electronic device 100b, may be stored in the non-encrypted data region 151 (refer to FIG. 10) of the non-volatile memory 150 without an encryption process. Data that do not require a high level of security may be encrypted by an encryption algorithm, which is different from homomorphic encryption, such as an AES encryption algorithm or an RSA encryption algorithm, and the data thus encrypted may be stored in the encrypted data region 152 of the non-volatile memory 150.

Figure 12:
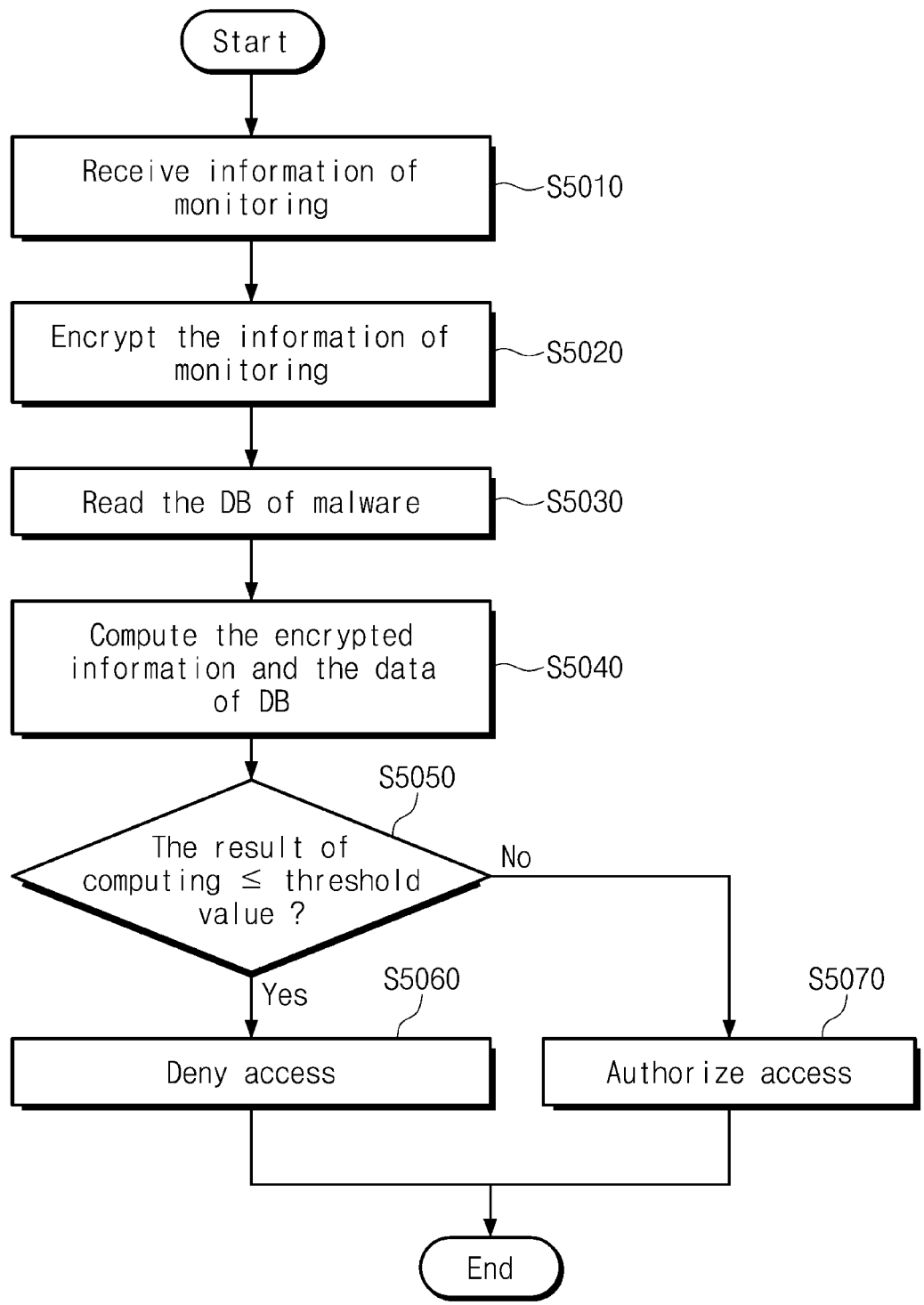
FIG. 12 is a flowchart illustrating a method of detecting a malicious code at an electronic device with a malicious code determination function disclosed in FIG. 10.

FIG. 12 is a flowchart illustrating a method of detecting a malicious code at the electronic device 100b (refer to FIG. 10) with the malicious code determination function disclosed in FIG. 10. The malicious code detecting method disclosed in FIG. 12 may be performed after the malicious code database building method of FIG. 11 is executed at least once. Accordingly, the method of detecting a malicious code as illustrated in FIG. 12 is executed subsequent to the storing of the malicious code database in homomorphic encryption region 153 of the non-volatile memory 150.

In operation S5010, the APU 110 (refer to FIG. 10) may monitor whether a specific access pattern occurs. The interpreter 180 (refer to FIG. 10) of the APU 110 may detect whether a candidate access pattern occurs, from received monitoring information.

In operation S5020, the APU 110 may read the public key stored in the non-volatile memory 150 in operation S4040 of the database building method described with reference to FIG. 11 and may homomorphic encrypt information of the candidate access pattern received from the modem 170b based on the public key. The APU 110 may generate encrypted data by performing homomorphic encryption on the information of the candidate access pattern.

In operation S5030, the APU 110 may read malicious code database information for the purpose of determining whether the encrypted data targeted for determination correspond to a malicious code. The malicious code database information that are reference data used for the electronic device 100b with the malicious code determination function to determine a malicious code means data included in a database created by implementing the malicious code database building methods described with reference to FIG. 11 in parallel or sequentially.

In operation S5040, the APU 110 may compute the encrypted data and data included in the malicious code database by using the multiplication key, the rotation key, and the like included in the public key. For example, the APU 110 may perform large and small comparison, sum, or multiplication on the encrypted data and the data included in the database. The APU 110 may transfer a result of computing the encrypted data and the data included in the database to the IEE 140 through the mailbox protocol.

In operation S5050, the IEE 140 may decode the computation result of the encrypted data and the data included in the database and may compare the decoded computation result with a threshold value. The threshold value means a value that is stored in advance for the purpose of interpreting a data computation result at the electronic device 100b with the malicious code determination function. The threshold value may be stored in the memory 144 (refer to FIG. 3) included in the IEE 140.

When the decoded computation result is smaller than the threshold value, the electronic device 100b with the malicious code determination function may proceed to operation S5060 and may deny an access to the corresponding code. When the decoded computation result is not smaller than the threshold value, the electronic device 100b with the malicious code determination function may proceed to operation S5070 and may authorize the access to the corresponding code.

The description as above description of the electronic device 100 (refer to FIG. 1) according to an embodiment of the inventive concept includes one APU 110 (refer to FIG. 1), one IEE 140 (refer to FIG. 1), and one non-volatile memory 150 (refer to FIG. 1). However, the electronic device 100 disclosed in the specification may be only one embodiment of the inventive concept. For example, the electronic device 100 according to an embodiment of the inventive concept may include a plurality of APUs 110, a plurality of IEEs 140, or a plurality of non-volatile memories 150. Also, the electronic device 100 may be implemented in the form of any electronic device, which requires data security, such as a desktop, a notebook computer, a smartphone, a tablet PC, or a wearable device.

An electronic device and an encrypted data processing method according to the inventive concept may reduce a risk of data leakage over a network and may provide a high level of security.

The electronic device and the encrypted data processing method according to the inventive concept may prevent a delay of data processing by using selective homomorphic encryption, thus improving performance of processing of encrypted data.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method of processing an encrypted data, the method comprising:
   receiving first data from an external source;
   loading a public key generated at an isolated execution environment (IEE);
   homomorphic encrypting the first data based on an encryption key included in the public key to generate first encrypted data;
   storing the public key and the first encrypted data in a non-volatile memory;
   receiving second data from the external source;
   loading the public key stored in the non-volatile memory;
   homomorphic encrypting the second data based on the encryption key included in the public key to generate second encrypted data; and
   performing computation on the first encrypted data and the second encrypted data based on a multiplication key included in the public key.

2. The method of claim 1, further comprising:
   transmitting, from a processing unit, a command for generating a secret key and a public key to the IEE when the first data are received.

3. The method of claim 2, further comprising:
   when the command is received by the IEE, generating, at the IEE, the secret key and generating the public key based on the secret key.

4. The method of claim 3, further comprising:
   transferring the public key to a location external of the IEE; and
   storing the secret key in a secret key storage included in the IEE.

5. The method of claim 1, wherein the performing of the computation includes:
   performing a boot-strapping process based on a rotation key included in the public key.

6. The method of claim 2, wherein the non-volatile memory includes a non-encrypted data region, an encrypted data region, and a homomorphic encryption data region, and
   wherein the first encrypted data generated based on the public key and the homomorphic encrypting are stored in the homomorphic encryption data region.

7. The method of claim 6, wherein the homomorphic encryption data region includes a single level cell (SLC), a multi-level cell (MLC), a triple level cell (TLC), and a quad level cell (QLC), and
   wherein the processing unit classifies the first encrypted data based on a size, an access frequency, or a required speed of the first encrypted data and stores the first encrypted data in one of the SLC, the MLC, the TLC, and the QLC.

8. The method of claim 1, wherein the homomorphic encrypting uses a ring learning with errors (RLWE) encryption technique.

9. An electronic device with a biometric authentication function, comprising:
   a biometric recognition device configured to receive first biometric information from an external source;
   a processing unit configured to transmit a secret key generation command and a public key generation command;
   an isolated execution environment (IEE) configured to generate a secret key in response to the secret key generation command, to generate a public key based on the secret key in response to the public key generation command, and to store the secret key; and
   a non-volatile memory configured to perform a write operation and a read operation depending on a request of the processing unit,
   wherein, when the first biometric information is received, the processing unit transmits a public key request to the IEE,
   wherein the IEE transfers the public key to the processing unit in response to the public key request,
   wherein the processing unit generates first encrypted data by performing homomorphic encryption on the first biometric information based on an encryption key included in the public key, and
   wherein the processing unit stores the first encrypted data in the non-volatile memory.

10. The electronic device of claim 9, wherein the processing unit includes:
   a homomorphic encryption accelerator configured to accelerate the homomorphic encryption.

11. The electronic device of claim 9, wherein the IEE includes:
- a homomorphic encryption key generator configured to generate the secret key and the public key;
- a secret key storage configured to store the secret key; and
- a decoder configured to decode a computation result associated with the first encrypted data based on the secret key.

12. The electronic device of claim 11, wherein the homomorphic encryption key generator includes:
- an NTT/INTT computing unit configured to perform a number theoretic transform (NTT) and an inverse number theoretic transform (INTT);
- a Mult/Modulo computing unit configured to perform a multiplication operation and a modulo operation; and
- a Gaussian random number generator configured to generate a random number for generating the secret key and the public key.

13. The electronic device of claim 11, wherein, when the secret key and the public key are generated, the IEE blocks an access from the processing unit to the IEE.

14. The electronic device of claim 9, wherein the biometric recognition device is configured to receive second biometric information from the external source, and
wherein the processing unit is configured to:
- generate second encrypted data by encrypting the second biometric information based on the encryption key;
- read the first encrypted data from the non-volatile memory; and
- preform a computation on the second encrypted data and the first encrypted data.

15. The electronic device of claim 14, wherein the electronic device is configured to determine whether to access the electronic device based on a result of the computation.

16. A method of processing an encrypted data of an electronic device, the method comprising:
- receiving first biometric information from an external source;
- loading a public key generated at an isolated execution environment (IEE);
- homomorphic encrypting the first biometric information based on an encryption key included in the public key to generate first encrypted data;
- storing the public key and the first encrypted data in a non-volatile memory;
- receiving second biometric information from the external source;
- loading the public key stored in the non-volatile memory;
- homomorphic encrypting the second biometric information based on the encryption key included in the public key to generate second encrypted data;
- performing a computation on the first encrypted data and the second encrypted data based on a multiplication key included in the public key; and
- determining whether to access the electronic device based on a result of the computation.

17. The method of claim 16, further comprising:
transmitting, from a processing unit, a command for generating a secret key and a public key to the IEE when the first biometric information is received.

18. The method of claim 17, further comprising:
when the command is received by the IEE, generating, at the IEE, the secret key and generating the public key based on the secret key.

19. The method of claim 18, further comprising:
- transferring the public key to a location external of the IEE; and
- storing the secret key in a secret key storage included in the IEE.

20. The method of claim 16, wherein the performing of the computation includes:
performing a boot-strapping process based on a rotation key included in the public key.

* * * * *